United States Patent
Ostling et al.

(10) Patent No.: US 11,285,543 B2
(45) Date of Patent: Mar. 29, 2022

(54) ESTIMATION OF DEFLECTION OF A CUTTING EDGE

(71) Applicant: SANDVIK INTELLECTUAL PROPERTY AB, Sandviken (SE)

(72) Inventors: Dan Ostling, Trondheim (NO); Tormod Jensen, Ranheim (NO); Mathias Tjomsland, Trondheim (NO); Oddvar Standal, Trondheim (NO); Ole Henrik Johansen, Jakobsli (NO); Arnt Erik Reinsbakk, Trondheim (NO)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 2 days.

(21) Appl. No.: 16/330,918

(22) PCT Filed: Aug. 24, 2017

(86) PCT No.: PCT/EP2017/071272
§ 371 (c)(1),
(2) Date: Mar. 6, 2019

(87) PCT Pub. No.: WO2018/046304
PCT Pub. Date: Mar. 15, 2018

(65) Prior Publication Data
US 2019/0232377 A1    Aug. 1, 2019

(30) Foreign Application Priority Data

Sep. 9, 2016  (EP) .................................. 16188133

(51) Int. Cl.
*B23B 27/00* (2006.01)
*B23Q 17/12* (2006.01)
(Continued)

(52) U.S. Cl.
CPC ............ *B23B 27/007* (2013.01); *B23B 25/06* (2013.01); *B23Q 17/12* (2013.01);
(Continued)

(58) Field of Classification Search
CPC ....... B23B 27/00; B23B 27/007; B23B 29/00; B23B 25/06; B23B 2260/128;
(Continued)

(56) References Cited

U.S. PATENT DOCUMENTS 3,967,515 A    7/1976 Nachtigal et al.
4,554,495 A    11/1985 Davis
(Continued)

FOREIGN PATENT DOCUMENTS

CN    106270592 A    1/2017
JP    H10109204 A    4/1998
(Continued)

*Primary Examiner* — Nicole N Ramos
(74) *Attorney, Agent, or Firm* — Corinne R. Gorski

(57) ABSTRACT

A cutting tool, a turning machine including the cutting tool, and an associated method are provided. The cutting tool includes a tool, a cutting head, a strain gauge, and an accelerometer. The cutting head is located at the tool bar and has a cutting edge. The strain gauge measures strain at the tool bar. The accelerometer measures acceleration at the tool bar or the cutting head. Deflection of the cutting edge is estimated based on output from the strain gauge and the accelerometer. In some embodiments, the accelerometer is arranged close to the cutting edge, while the strain gauge is arranged where the tool bar is susceptible to the largest strain. In some embodiments, low frequency vibrations of the cutting edge are estimated based on measured strain, high frequency vibrations are estimated based on measured acceleration, and medium frequency vibrations are estimated based on output from both sensor types.

14 Claims, 5 Drawing Sheets

(51) Int. Cl.
   *B23B 25/06*     (2006.01)
   *B23Q 17/22*     (2006.01)
(52) U.S. Cl.
   CPC .... *B23Q 17/2233* (2013.01); *B23B 2260/128* (2013.01); *B23Q 2717/003* (2013.01)
(58) Field of Classification Search
   CPC .... B23Q 17/12; B23Q 17/2225; B23Q 11/00; B23Q 2717/003
   See application file for complete search history.

(56) References Cited

U.S. PATENT DOCUMENTS

| | | | | |
|---|---|---|---|---|
| 4,555,955 | A | * | 12/1985 | Morgan ............. B23Q 17/0966 73/794 |
| 5,810,528 | A | | 2/1998 | O'Connor et al. |
| 5,816,122 | A | | 10/1998 | Benning et al. |
| 5,913,955 | A | | 6/1999 | Redmond et al. |
| 6,058,816 | A | | 5/2000 | Golioto |
| 7,647,853 | B2 | * | 1/2010 | Lundblad ........... B23Q 17/0971 82/1.11 |
| 7,908,947 | B2 | * | 3/2011 | Saeterbo ............ B23Q 11/0032 82/163 |
| 10,717,133 | B2 | * | 7/2020 | Standal .................. B23B 25/06 |
| 2002/0033083 | A1 | * | 3/2002 | Claesson ............ B23Q 11/0032 82/118 |
| 2016/0045994 | A1 | | 2/2016 | Jayr et al. |

FOREIGN PATENT DOCUMENTS

| | | |
|---|---|---|
| JP | S373999 B | 7/2000 |
| SU | 1234049 A | 5/1986 |
| WO | 8901192 A1 | 2/1989 |

* cited by examiner

ESTIMATION OF DEFLECTION OF A CUTTING EDGE

RELATED APPLICATION DATA

This application is a § 371 National Stage Application of PCT International Application No. PCT/EP2017/071272 filed Aug. 24, 2017 claiming priority to EP 16188133.9 filed Sep. 9, 2016.

TECHNICAL FIELD

The present disclosure generally relates to cutting tools for use in turning, and in particular to estimation of deflection of cutting edges of such cutting tools.

BACKGROUND

In machines for metal cutting such as machine tools, especially turning machines such as lathes, material is typically removed (or cut) from an exterior or interior surface of a work piece by rotating the work piece and by moving a cutting tool towards the work piece in a tangential and/or radial direction. The case where the cutting action provided by the cutting edge of the cutting tool is performed on an interior surface of the work piece (i.e. from inside a hole of the work piece) is sometimes referred to as boring. Knowledge of the position and orientation of the cutting edge of the cutting tool is important for providing high precision machining. In some cases, even a small deviation in the position or orientation of the cutting edge may reduce the machining precision below an acceptable level. During machining, the cutting edge may be deflected. Hence, even if the position of the cutting edge is known before the machining is initiated, the real position of the cutting edge during machining may be unknown. This may reduce the precision of the turning machine. The deflection of the cutting edge may include both static (or slowly changing) components and vibration components. The interaction of the cutting edge and the work piece may cause the cutting edge to vibrate. Depending on the amplitude and/or frequency of these vibrations, the durability or performance of the cutting edge may be affected. For example, vibrations may reduce the surface quality provided at the work piece. For at least the reasons described above, it would be desirable to estimate deflection of the cutting edge during operation of a turning machine.

SUMMARY

To better address at least one of the abovementioned issues, cutting tools and methods having the features defined in the independent claims are provided. Preferable embodiments are defined in the dependent claims.

Hence, according to a first aspect, a cutting tool for use in turning is provided. The cutting tool comprises a tool bar, a cutting head, a strain gauge, and an accelerometer. The cutting head is located (or positioned) at the tool bar and has a cutting edge. The strain gauge is arranged to measure strain at the tool bar. The accelerometer is arranged to measure acceleration at the tool bar or at the cutting head. The accelerometer is arranged closer than the strain gauge to the cutting edge.

A strain gauge may be employed to measure strain at the cutting tool, and the measured strain may be employed to estimate deflection of the cutting edge. Deflection of the cutting edge may for example be estimated based on strain measured at positions along the tool bar at which the strain is relatively large (such as close to a machine interface or close to a position along the tool bar at which the stiffness of the tool bar changes, as described below). Strain which returns periodically over time may for example indicate that the tool bar is swinging back and forth, and that the cutting edge is therefore vibrating. However, rapid motion of the cutting edge, or high frequency vibrations, may be difficult to detect accurately via strain gauges. Because of the dynamics of the cutting tool and the existence of many vibration modes, there may be no simple relationship between deflection and strain. Moreover, the sensitivity of strain measurements may be too low to be able to detect (or distinguish) the small vibrations that may be present at higher frequencies. The signal to noise ratio may simply be too low for high frequencies. Hence, it may be difficult to estimate the total deflection of the cutting edge based only on strain gauges.

An accelerometer may be employed to estimate high frequency vibrations of the cutting edge. The closer the accelerometer is to the cutting edge (such as closer than the strain gauge to the cutting edge), the more accurate the estimate may be. However, static deflection, or deflection caused by relatively slow acceleration (such as low frequency vibrations) may be difficult to monitor via an accelerometer. Hence, it may be difficult to estimate the total deflection of the cutting edge based only on accelerometers.

The inventors have realized that the strain measured by a strain gauge and the acceleration measured by an accelerometer complements each other, and may be employed together to provide a more accurate or complete estimate of the deflection of the cutting edge.

The output from the strain gauge and the accelerometer may for example be employed for estimating the position of the cutting edge as it moves during operation of a turning machine, or to estimate a spectrum of vibrations of the cutting edge. Such a spectrum of vibrations may indicate whether or not the cutting edge is able to provide a desired surface structure (or precision) at a work piece.

Throughout the present disclosure, the word "turning" refers to a machining process in which a work piece is rotated, and in which material is cut from the work piece by a cutting edge which does not rotate. During such a machining process, the cutting edge may for example be translated towards the rotating work piece to perform the cutting action, or the rotating work piece may be translated towards the cutting edge.

It will be appreciated that turning may for example be performed via interaction of the cutting edge and an exterior surface of a work piece, or via interaction of the cutting edge and an interior surface of a work piece (sometimes also referred to as boring).

The cutting tool (or turning tool) may for example be suitable for use in a turning machine.

The cutting head may for example be mounted at the tool bar or may be an integrated part of the tool bar.

The cutting edge may for example be a cutting edge of a cutting insert mounted at the cutting head.

The strain gauge may for example be arranged along the tool bar. The strain gauge may for example be arranged in the interior of the tool bar (or be integrated in the tool bar) so as to be protected from chips of material cut away from a work piece during machining. The strain gauge may for example be arranged at an exterior surface of the tool bar.

The accelerometer may for example be arranged at the tool bar or at the cutting head. The accelerometer may for example be integrated in the tool bar or cutting head. The accelerometer may for example be arranged in the interior of the tool bar or cutting head so as to be protected from chips of material cut away from a work piece during machining.

The distance from the strain gauge to the cutting edge may for example be at least 2, 3, 4, 5, 10, 20 or 100 times as long as the distance from the accelerometer to the cutting edge.

According to some embodiments, a certain portion of the tool bar along an axial direction of the tool bar may be susceptible to a largest strain. The strain gauge may be arranged at the certain portion.

When the cutting tool is employed during turning, the tool bar is subjected to strain. The certain portion is subjected to larger strain than the other portions of the tool bar. Strain is therefore more easily detected at the certain region and/or more clearly indicates how much the cutting edge is deflected. For example, the signal to noise ratio may be higher for the strain gauge if the strain gauge is arranged at the certain position. How much the cutting edge is deflected for a given strain may for example be measured (or determined) in a factory at which the cutting tool is manufactured, or when the cutting tool has been mounted in a turning machine. Estimation of the deflection of the cutting edge may for example be based on data from such measurements performed prior to turning.

According to some embodiments, the cutting tool may comprise a machine interface for mounting the cutting tool at a turning machine. A distance from the strain gauge to the cutting edge may be larger than a distance from the strain gauge to the machine interface. In other words, the strain gauge may be closer to the machine interface than to the cutting edge.

Strain is usually larger close to the machine interface than at other positions along the cutting tool. Deflection of the cutting edge may therefore be easier to estimate accurately based on strains measured close to the machine interface.

The distance from the strain gauge to the cutting edge may for example be at least 2, 3, 4 or 5 times as large as the distance from the strain gauge to the machine interface.

According to some embodiments, the tool bar may have a stiffness which transitions between a lower and a higher value at a certain location along the tool bar. A distance from the strain gauge to the cutting edge may be larger than a distance from the strain gauge to the certain location.

Strain is usually larger close to locations where the stiffness of the tool bar changes (such as where a diameter of the tool bar changes or where a material of the tool bar changes) than at other positions along the cutting tool. Deflection of the cutting edge may therefore be easier to estimate accurately based on strains measured at such a location.

The distance from the strain gauge to the cutting edge may for example be at least 2, 3, 4 or 5 times as long as the distance from the strain gauge to the certain location According to some embodiments, the cutting tool may comprise a machine interface for mounting the cutting tool at a turning machine. A distance from the accelerometer to the machine interface may be larger than a distance from the accelerometer to the cutting edge. In other words, the accelerometer may be closer to the cutting edge than to the machine interface.

Measuring acceleration close to the cutting edge allows motion (and thereby at least some component of the deflection) of the cutting edge to be more accurately estimated, compared to measuring acceleration farther away from the cutting edge.

The distance from the accelerometer to the machine interface may for example be at least 2, 3, 4, 5, 10, 20 or 100 times as long as the distance from the accelerometer to the cutting edge.

According to some embodiments, the distance from the accelerometer to the machine interface may be at least four times as long as the distance from the accelerometer to the cutting edge. A distance from the strain gauge to the cutting edge may be at least four times as large as a distance from the strain gauge to the machine interface.

The strain gauge may for example be arranged at (or close to) a rear end of the tool bar. The cutting head may for example be located at a front end of the tool bar. The accelerometer may for example be arranged at the cutting head or at (or close to) the front end of the tool bar.

According to some embodiments, the strain gauge may be adapted to measure strain indicative of bending of the tool bar in a radial direction relative to a work piece, or to measure strain indicative of bending of the tool bar in a tangential direction relative to the work piece.

The radial direction relative to the work piece may be a direction towards the center of the work piece or a direction away from the center of the work piece, depending on whether the cutting tool is employed for interior turning or exterior turning. The tangential direction relative to the work piece may be a direction in which the surface of the work piece interacting with the cutting edge is moving during turning, when in contact with the cutting edge (i.e. a direction tangential to the rotating motion of the work piece during turning). If the cutting tool is not yet mounted in a turning machine, the radial and tangential directions relative to the work piece may for example be identified by checking where the cutting edge is arranged and how the cutting edge is oriented. For example, the cutting edge may be adapted to interact with the work piece in specific directions (or orientations relative to the work piece) during turning.

Bending of the tool bar in a certain direction may cause strain at the side (or surface) of the tool bar from which the tool bar is bending away. The strain gauge may for example be arranged at that side (or surface).

The strain gauge may for example be arranged at a side of the tool bar opposite to the radial direction in which the tool bar will bend during turning. The strain gauge may for example be arranged at a side of the tool bar opposite to the tangential direction in which the tool bar will bend during turning.

Strain indicative of bending in the radial direction may for example be employed (for example in combination with acceleration in the radial direction) to estimate deflection of the cutting edge in the radial direction. Strain indicative of bending of the tool bar in the tangential direction may for example be employed (for example in combination with acceleration in the tangential direction) to estimate deflection of the cutting edge in the tangential direction.

According to some embodiments, the cutting tool may comprise strain gauges arranged to measure strain at the tool bar indicative of bending of the tool bar in respective directions. The cutting tool may comprise accelerometers arranged to measure acceleration at the tool bar or at the cutting head in respective directions. The accelerometers may be arranged closer than the strain gauges to the cutting edge.

The directions in which the accelerations are measured may for example coincide with the bending directions of the tool bar monitored via the strains measured by the strain gauges. Deflections of the cutting edge in the respective directions may for example be estimated independently of each other.

In case the directions monitored by the accelerometers and the strain gauges do not coincide, the measured accelerations may for example be transformed (for example via trigonometric computations) into accelerations in the bending directions of the tool bar monitored by the strain gauges.

According to a second aspect, a turning machine is provided. The turning machine comprises the cutting tool as defined in any of the embodiments of the first aspect.

The turning machine may for example be a lathe.

The turning machine may for example be arranged to rotate a work piece. The turning machine may for example comprise a spindle for rotating a work piece.

According to some embodiments, the turning machine may comprise a processing section (or processor) configured to estimate deflection of the cutting edge based on output from the strain gauge and the accelerometer.

The processing section may for example estimate deflection in one or more directions, and/or an overall size/magnitude of the deflection.

The processing section may for example estimate an average deflection during a time interval (which may for example be referred to as a static component of the deflection) and/or a maximum deflection during the time interval.

The deflection estimated by the processing section may for example include vibration components.

The processing section may for example estimate a spectrum of vibrations of the cutting edge.

The processing section may for example estimate a position of the cutting edge (i.e. a real position when the cutting edge is deflected).

The processing section may for example be integrated in the cutting tool, or may be arranged in a location remote from the cutting tool.

According to a third aspect, there is provided a method for estimating deflection of a cutting edge of a cutting head. The method comprises providing a turning machine comprising a cutting tool. The cutting tool comprises a tool bar and the cutting head. The cutting head is located at the tool bar. The method comprises measuring strain at the tool bar during turning. The method comprises measuring acceleration at the tool bar and/or the cutting head during turning. The method comprises estimating deflection of the cutting edge based on the measured strain and the measured acceleration.

The advantages presented above for features of cutting tools according to the first aspect, and turning machines according to the second aspect, may generally be valid for the corresponding features of methods according to the third aspect.

Estimation of the deflection may for example be performed in real time (i.e. during turning) or may be performed at some later point in time.

According to some embodiments, a distance from the cutting edge to a position at which the strain is measured may be longer than a distance from the cutting edge to a position at which the acceleration is measured.

According to some embodiments, estimating the deflection may comprise estimating, based on the measured strain, deflection of the cutting edge in a first frequency range. The first frequency range may include static deflection and vibrations having frequencies up to a first frequency. Estimating the deflection may comprise estimating, based on the measured acceleration, deflection of the cutting edge in a second frequency range. The second frequency range may include vibrations having frequencies above a second frequency which is at least as high as the first frequency.

As describe above, output from strain gauges is better suited for estimating static deflection and low frequency vibrations (i.e. the first frequency range), while output from accelerometers is better suited for estimating high frequency vibrations (i.e. the second frequency range). Together, the estimated deflection components of the cutting edge in the first and second frequency ranges provide a more complete picture of the overall deflection of the cutting edge. Such an overall deflection may for example be monitored during turning to detect when to modify parameters of the machining process (for example to compensate depth of cut, adjust the speed of rotation, and/or adjust the feed rate), or may be analyzed after the turning has been completed to detect deviations between desired diameter (for example as programmed on a machine controller) and achieved diameter, and/or to detect portions of the work piece at which defects or regions of lower surface quality are most likely to be located (for example due to vibrations in a certain frequency range having too high amplitude).

It will be appreciated that acceleration and strain may for example be measured simultaneously, and that the data collected from these measurements may then be employed to carry out the respective estimates, as described above.

According to some embodiments, estimating the deflection may comprise estimating, based on the measured strain and the measured acceleration, deflection in a third frequency range. The third frequency range may include vibrations having frequencies between the first and second frequency.

Although both the measured strain and the measure acceleration provide some information about vibrations with frequencies between the first and second frequency, such vibrations may be difficult to estimate accurately based only on one of these two types measurements. The measured strain and the measured acceleration complement each other in the third frequency range so that deflection in that frequency range may be estimated more accurately and/or more robustly. The impact of measurement noise may for example be reduced.

According to some embodiments, the method may comprise measuring acceleration at the cutting tool prior to turning. The method may comprise estimating an orientation of the cutting tool based on the acceleration measured prior to turning. At least one accelerometer may be employed for the measuring of acceleration both prior to turning and during turning. In other words, the same accelerometer may be employed for two different types of estimates, estimation of orientation and estimation of deflection.

Even a small deviation in the orientation of the cutting edge may reduce the machining precision below an acceptable level. The orientation of the cutting edge may for example be determined via knowledge of the orientation of the cutting tool. Some cutting tools have a planar surface on which a sprit level may be placed for checking that the cutting tool has been mounted at the correct orientation. Use of the same accelerometer as employed for estimating deflection of the cutting edge during turning facilitates mounting or orienting of the cutting tool at a proper orientation.

The accelerometer may for example be integrated in the tool bar or cutting head so as to be protected from chips created during interaction the cutting edge and the work piece during turning.

Prior to turning, when the tool bar is not deflected, the tool bar may for example extend along an axis. Even if the tool bar may not be straight, a main portion of the tool bar may for example at least substantially extend along an axis. The processing section may for example be arranged to estimate a rotational orientation of the cutting tool with respect to the axis based on the acceleration measured prior to turning. The axis may for example be horizontal. The axis may for example be parallel to (or orthogonal to) an axis of rotation for a work piece to be rotated by the turning machine.

It is noted that embodiments of the present disclosure relate to all possible combinations of features recited in the claims. Further, it will be appreciated that the various embodiments described for the cutting tool according to the first aspect, or the turning machine according to the second aspect, are all combinable with embodiments of the method according to the third aspect.

BRIEF DESCRIPTION OF THE DRAWINGS

In what follows, example embodiments will be described in greater detail and with reference to the accompanying drawings, on which.

All the figures are schematic and generally only show parts which are necessary in order to elucidate the respective embodiments, whereas other parts may be omitted or merely suggested.

DETAILED DESCRIPTION

Figure 1:
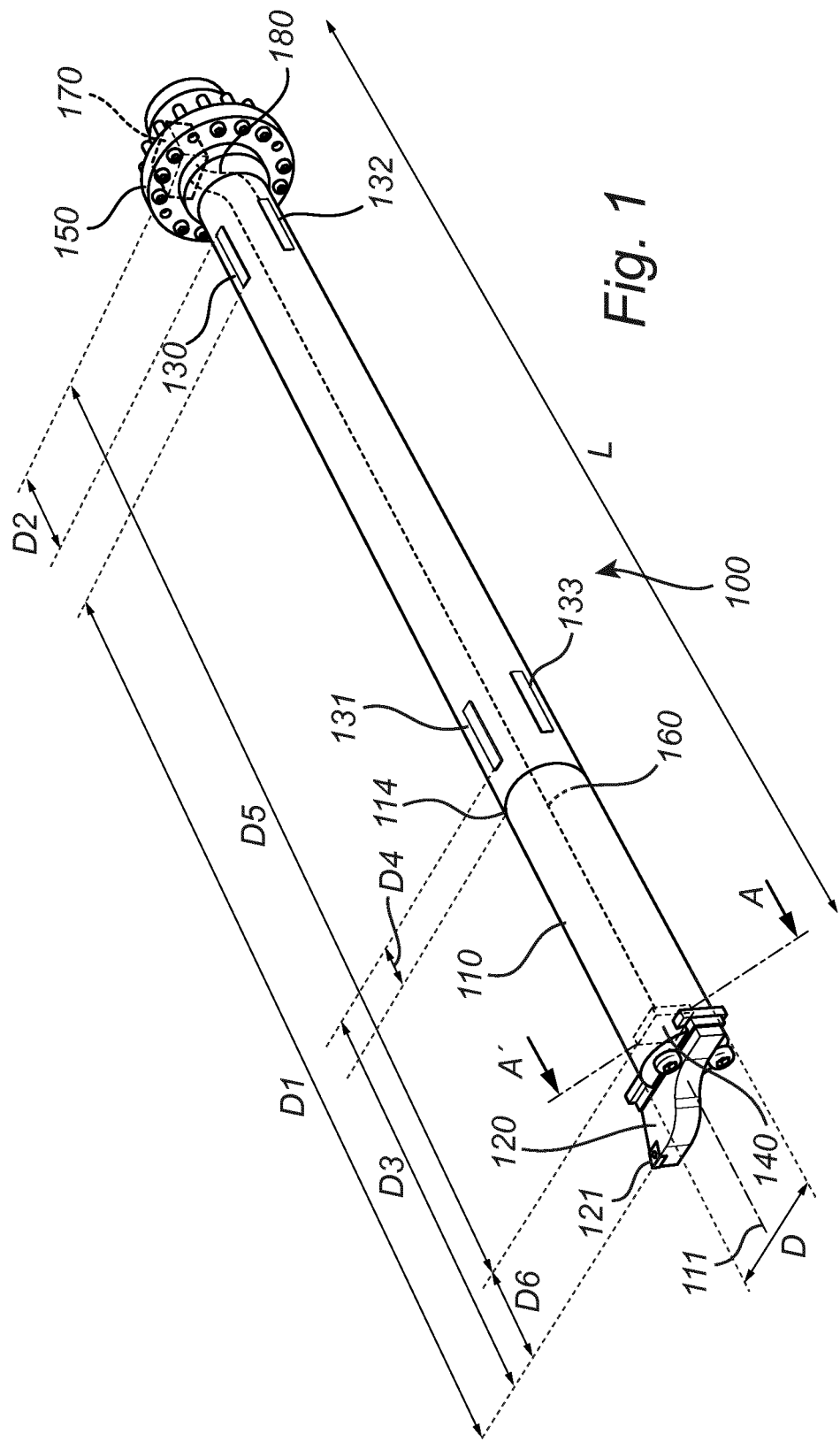
FIG. 1 is a perspective view of a cutting tool, according to an embodiment.

FIG. 1 is a perspective view of a cutting tool 100, according to an embodiment. The cutting tool 100 is a cutting tool adapted for the well-known machining process called turning. The cutting tool 100 comprises a tool bar 110 (which may also be referred to as a turning bar 110), a cutting head 120, a strain gauge 130 and an accelerometer 140. The cutting head 120 is located at the tool bar 110 and has a cutting edge 121. The strain gauge 130 is arranged to measure strain at the tool bar 110. The accelerometer 140 is arranged to measure acceleration at the tool bar 110 or at the cutting head 120. The accelerometer 140 is arranged closer than the strain gauge 130 to the cutting edge 121. As will be described below, the cutting tool 100 may for example comprise multiple strain gauges 130-133 and multiple accelerometers 140.

The tool bar 110 is an elongate element or elongate member. In the present embodiment, the tool bar 110 is a cylindrical element extending along an axis 111 (when the tool bar 110 is not bent due to cutting forces). The cutting head 120 is arranged or mounted at one end of the tool bar 110. Embodiments may also be envisaged in which the cutting head 120 is arranged close to the end of the tool bar 110, for example behind a damper (not shown in FIG. 1).

Embodiments may also be envisaged in which a main portion (or main part) of the tool bar 110 extends along the axis 111 while other portions (or parts) of the tool bar 110 are curved or arranged at an angle relative to the axis.

In the present embodiment, a machine interface 150 is arranged at the end of the tool bar 110 opposite to the cutting head 120 and is adapted for mounting the cutting tool 100 in a turning machine. The cutting edge 121 is located in an insert (or cutting insert) mounted at the cutting head 120. The cutting edge 121 is adapted to cut away material (for example metal) from a work piece.

The cutting tool 100 may be employed for external turning wherein material from an external surface of a work piece is removed. As the cutting head 120 is located at the end of the tool bar 110, the cutting tool 100 may also be employed for internal turning wherein material from an internal surface of a work piece (for example within a hole of the work piece) is removed. Internal turning is sometimes also called boring. Embodiments may also be envisaged in which the tool bar 110 has machine interfaces 150 at both ends, and where the cutting head 120 is located along the tool bar 110, for example at the middle of the tool bar 110. However, such embodiments in which the cutting head 120 is not placed close to an end of the tool bar 110 may not be as suitable for interior turning as the embodiment described with reference to FIG. 1. In some embodiments, the cutting head 120 may be integrated with the tool bar 110 rather than being mounted at (or attached to) the tool bar 110. In other words, the cutting head 120 may be an integrated part of the tool bar 110.

The tool bar 110 may for example comprise metal such as steel, carbon fiber and/or cemented carbide. The cutting head 120 may for example comprise metal such as steel, titanium, and/or aluminium. The cutting edge 121 may for example comprise cemented carbide. The cutting tool 100, the tool bar 110, the cutting head 120 and/or the cutting edge 121 may for example be adapted for metal cutting.

In the present embodiment, the tool bar 110 is relatively long, so as to be able to perform turning within a relatively deep hole of a work piece. The tool bar 110 may for example have a length L which is at least 5, 10, 15 or 20 times the diameter D of the tool bar 110. As the tool bar 110 is so long, it bends more easily during turning than shorter tool bars. When the tool bar 110 bends, the cutting edge 121 is deflected from its resting position. In order to provide high precision turning, it may therefore be desirable to estimate the deflection of the cutting edge 121. As will be described below, the strain gauge 130 and the accelerometer 140 may be employed to estimate this deflection.

The strain gauge 130 may for example be based on a strain gauge resistor, piezoelectric sensor or a force transducer. The strain gauge 130 may for example be an optical strain gauge, or a surface acoustic wave (SAW) strain sensor.

The accelerometer 140 may for example be an analog or digital accelerometer. Compared to other types of sensors which may be employed to estimate motion, accelerometers with size and durability suitable for use in a cutting tool 100 may be relatively easy to manufacture.

In the present embodiment, the accelerometer 140 is located in the interior of the tool bar 110. The accelerometer 140 is therefore protected from metal chips created during machining. Embodiments may also be envisaged in which the accelerometer 140 is located along the exterior surface of the tool bar 110 or in the interior of the cutting head 120.

In the present embodiment, the strain gauge 130 is located on the exterior surface of the tool bar 110. Embodiments may also be envisaged in which the strain gauge 130 is located in the interior of the tool bar 110. The tool bar 110 may for example comprise a centrally located metal rod (for example comprising steel) surrounded by rings of cemented carbide. As cemented carbide may have relatively low tensile strength, the metal rod may be employed to compress the rings of cemented carbide in the axial direction 111. The strain gauge 130 may for example be arranged at an interior or exterior surface of the rings, or at the exterior surface of the metal rod.

Output from the accelerometer 140 may for example be transmitted wirelessly, or via a wire 160, to a processing section 170. The processing section 170 may for example be located in the cutting tool 100 itself (for example at the machine interface 150 or close to the accelerometer 140) or at some location outside the cutting tool 100. Similarly, output from the strain gauge 130 may for example be transmitted wirelessly, or via a wire 180, to the processing section 170.

The cutting tool 100 may for example comprise a battery (not shown) or some other internal power source for powering the accelerometer 140, the strain gauge 130 and the processing section 170. The cutting tool 100 may for example be adapted to be connected to an external power source for powering the accelerometer 140, the strain gauge 130 and the processing section 170.

Figure 2:
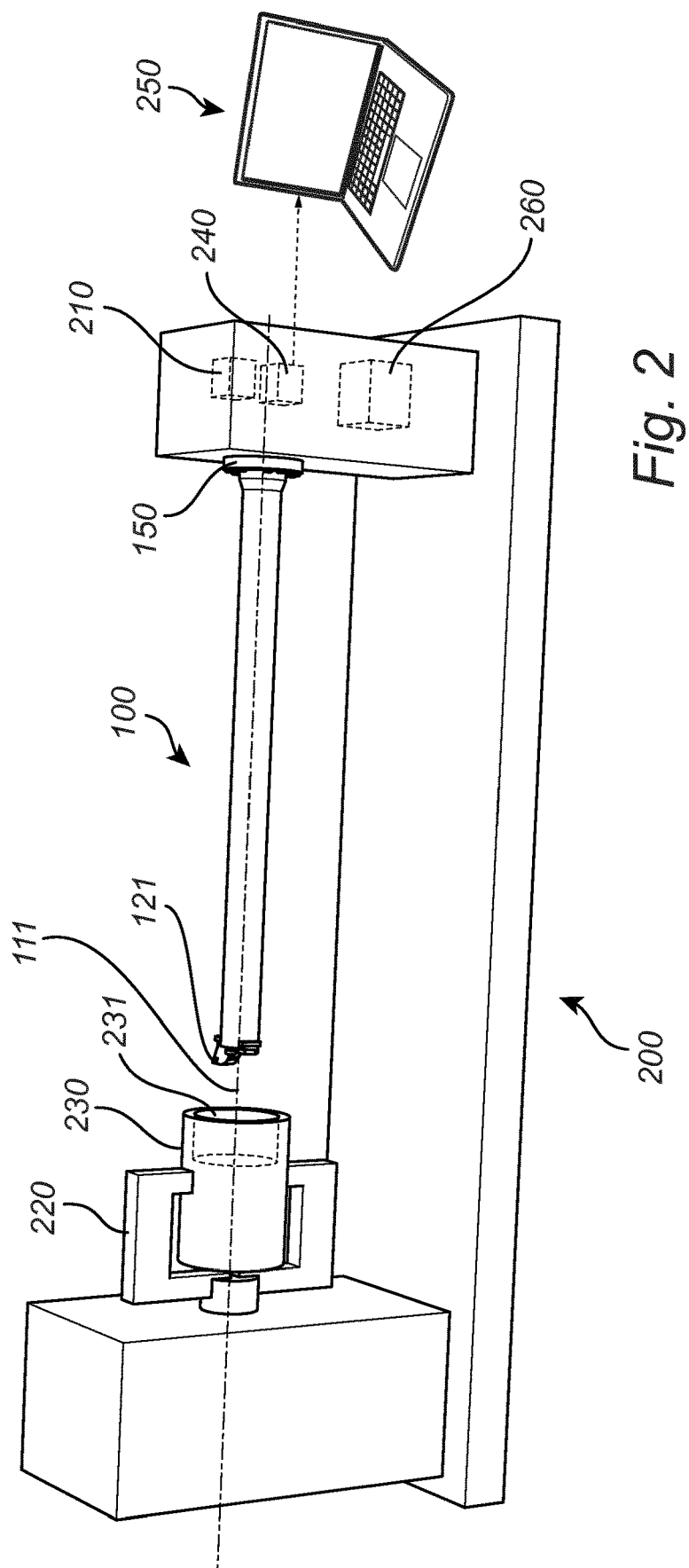
FIG. 2 is a perspective view of a turning machine comprising the cutting tool shown in FIG. 1, according to an embodiment.

FIG. 2 is perspective view of a turning machine 200 comprising the cutting tool 100 described with reference to FIG. 1, according to an embodiment. The cutting tool 100 has been mounted such that the axis 111 is horizontal. The turning machine 200 is adapted to estimate the deflection of the cutting edge 121 based on the output provided by the strain gauge 130 and the accelerometer 140. The turning machine 200 may for example comprise a processing section 210 configured to estimate the deflection of the cutting edge 121 based on the output provided by the strain gauge 130 and the accelerometer 140. The processing section 210 may for example be located in the cutting tool 100 (it may for example coincide with the processing section 170 described with reference to FIG. 1) or may be located in some other part of the turning machine 200.

The turning machine 200 comprises a spindle 220 for rotating a work piece 230. The cutting tool 100 is mounted via the machine interface 150 such that it may be moved (or translated) towards the work piece 230 for cutting away material from the work piece 230 as the work piece 230 rotates. The tool bar 110 and the cutting edge 121 do not rotate during operation of the turning machine 200. In the present embodiment, the work piece 230 has a hole 231 in which the cutting tool 100 may cut away material for expanding the hole 231.

The turning machine 200 may comprise a communication interface 240 configured to provide signaling indicating the estimated deflection. The signaling provided by the communication interface 240 may be provided via wired or wireless signals (for example via Bluetooth) to a remotely located device 250 having a user interface for indicating the estimated deflection to a user. The estimated deflection may for example be shown on a screen in real time. The device 250 may for example process or analyze the deflection during machining, and may present, after the machining, an overview of the deflection that has occurred during machining. For example, the device 250 may indicate regions of the work piece 230 at which vibrations may have caused the machined surface to be of lower quality or lower precision than usual. The device 250 may for example be a personal computer or a hand held device such as a mobile phone or tablet computer.

The communication interface 240 may communicate with the processing section 210 wirelessly or via a wired connection. In some embodiments, the processing section 210 and/or the communication interface 240 may be located (or integrated in) the cutting tool 100.

The turning machine 220 may comprise a user interface 260 configured to indicate the estimated deflection to a user. The user interface 260 may for example be a screen arranged to visually convey the estimated deflection to the user, or an audio interface for signaling via sound when the deflection is too high (for example higher than a tolerance level). The user interface 260 may for example indicate to the user when vibrations (or chatter) of the cutting tool 100 have too high amplitude, and that the feed rate of the cutting tool 100 or the rotational speed of the work piece 230 should be modified.

The turning machine 200 may for example comprise a memory or data storage (not shown) for storing output from the strain gauge 130 and/or the accelerometer 140, and/or the estimated deflection, so as to enable subsequent analysis of this data. Such data may alternatively be stored in a remote data storage, such as a cloud storage.

Embodiments may also be envisaged in which output from the strain gauge 130 and the accelerometer 140 is provided by the communication interface 240 to the external device 250. The external device 250 may for example estimate the deflection of the cutting edge 121 based on the received sensor output. In such embodiments, there may be no need for the turning machine 200 to process the output provided by the strain gauge 130 and the accelerometer 140 or to estimate the deflection of the cutting edge 121.

Figure 3:
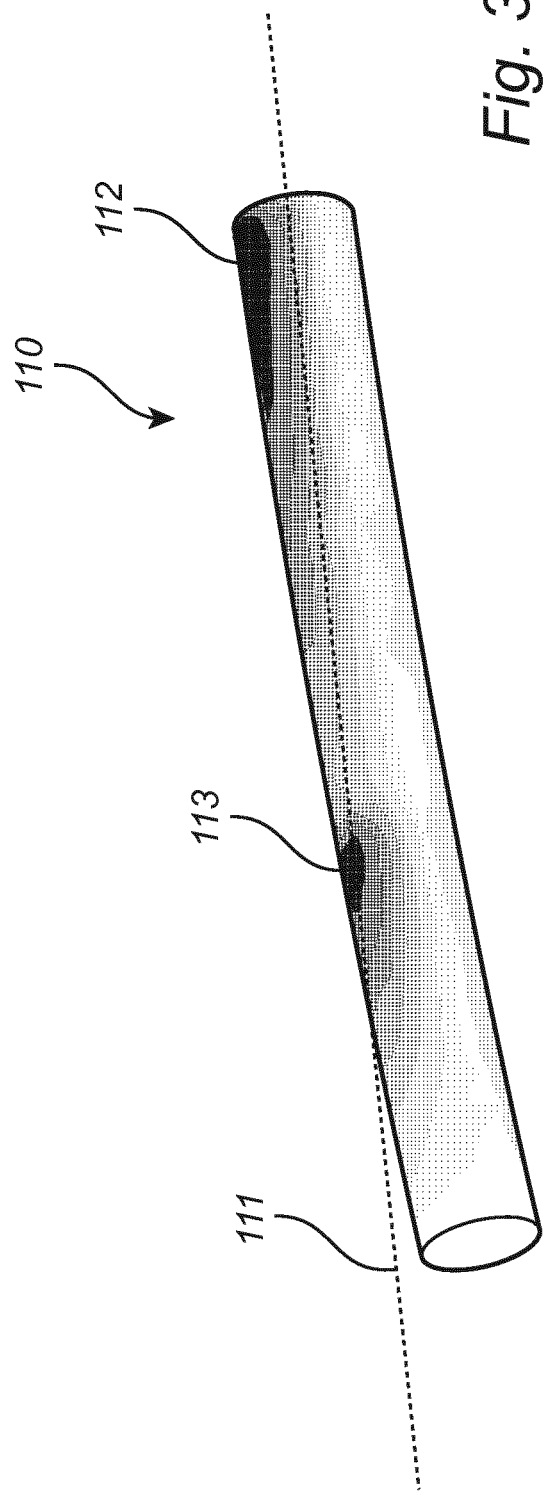
FIG. 3 shows strain to which the cutting tool shown in FIG. 1 may be subjected.

FIG. 3 shows tangential strain (i.e. strain only in one direction) to which the cutting tool 100 described with reference to FIG. 1 may be subjected during machining. For simplicity, only strain at the tool bar 110 of the cutting tool 100 is shown in FIG. 3. In FIG. 3, darker color means higher strain. The strain will be in the form of tension on one side of the tool bar 110 and compression on the opposite side of the tool bar 110.

In the present embodiment, the work piece 230 is rotated clock-wise in the turning machine 200. When the cutting edge 121 interacts with the rotating work piece 230, the cutting edge 121 is subjected to a force directed downwards in the tangential direction, and a force directed radially towards the center of rotation of the work piece 230. The tangential force causes the tool bar 110 to bend slightly downwards so that the cutting edge 121 is deflected downwards. The strain caused by this downward bending is shown in FIG. 3. The radial component of the cutting force causes the bar to bend radially. Cutting forces generate both tangential and radial deflection.

Different portions of the tool bar 110 bends more than others. Strain is therefore larger at such portions. Portions at which the strain is large are more suitable for estimation of the deflection of the cutting edge 121 than those portions which are subjected to less strain since the signal to noise ratio is higher there. In other words, the strain gauge 130 may be located at a certain portion of the tool bar 110 which is susceptible to the largest strain. How the deflection of the cutting edge 121 depends on the strain may be specific for each cutting tool 100 and for each position along the tool bar 110. As described below, this dependence may be determined when the cutting tool 100 has been mounted in the turning machine 200.

The portion 112 of the tool bar 110 located close to the machine interface 150 is subjected to particularly high strain. The strain gauge 130 may therefore be placed at that portion 112. In other words, the strain gauge 130 may be placed at the back end of the tool bar 110 close to the machine interface 150. With this placement of the strain gauge 130, the distance D1 from the strain gauge 130 to the cutting edge 121 is larger than the distance D2 from the strain gauge 130 to the machine interface 150. In fact, the distance D1 from the strain gauge 130 to the cutting edge 121 may be as much as 2, 3, 4, 5, or 10 times longer than the distance D2 from the strain gauge 130 to the machine interface 150.

The tool bar 110 need not be homogeneous. The radius of the tool bar 110 and/or the material of the tool bar 110 may change along the tool bar 110. This may cause the stiffness of the tool bar 110 to change. In the present embodiment, a damper (not shown) is arranged in the half of the tool bar 110 located closest to the machine interface 150 for mitigating vibrations. There is a certain location 114 (or boundary 114) along the tool bar 110 at which the damper ends and a stiffer portion of the tool bar 110 starts. In other words, there is a transition at that location 114 between a lower stiffness and a higher stiffness. The region 113 close to the boundary 114 (at the side where the stiffness is lower) is subjected to relatively high strain. A strain gauge 131 may therefore be placed in that region 113, either as a complement to the strain gauge 130 or instead of the strain gauge 130. With this placement of the strain gauge 131 in the region 113, the distance D3 from the strain gauge 131 to the cutting edge 121 is longer than the distance D4 from the strain gauge 131 to the boundary 114 at which the stiffness of the toolbar 100 transitions from a lower value to a higher value. In fact, the distance D3 from the strain gauge 131 to the cutting edge 121 may be as much as 2, 3, 4, 5, or 10 times as long as the distance D4 from the strain gauge 131 to the boundary 114.

In the present embodiment, the accelerometer 140 is arranged at the front end of the tool bar 110 close to the cutting edge 121. With this placement of the accelerometer 140, the distance D5 from the accelerometer 140 to the machine interface 150 is longer than the distance D6 from the accelerometer 140 to the cutting edge 121. In fact, the distance D5 from the accelerometer 140 to the machine interface 150 may be as much as 2, 3, 4, 5, 10, 20, or 100 times the distance D6 from the accelerometer 140 to the cutting edge 121. Embodiments may also be envisaged in which the accelerometer 140 is located further away from the cutting edge 121, although the acceleration is preferably measured close to the cutting edge to improve accuracy of the estimated deflection.

In the present embodiment, the accelerometer 140 is integrated in the tool bar 110, at a position close to the cutting head 120. Embodiments may also be envisaged in which the accelerometer is integrated in the cutting head 120 (for example in an insert at which the cutting edge 121 is provided).

In order to estimate deflection of the cutting edge 121 downwards (i.e. the tangential direction relative to the work piece 230), the strain gauges 130 and 131 are arranged on top of the tool bar 110, so as to measure strain at the surface there. In other words, the strain gauges 130 and 131 are adapted to measure strain indicative of bending of the tool bar 110 in the tangential direction relative to the work piece 230. Measurements from such strain gauges 130 and 131 may be employed together with acceleration measured in the tangential direction for estimating deflection of the cutting edge in the tangential direction, i.e. downwards.

Similarly, strain gauges 132 and 133 may be arranged on the side of the tool bar 110, so as to estimate deflection of the cutting edge in the radial direction of the work piece 230 which in this case is horizontally. In other words, the strain gauges 132 and 133 are adapted to measure strain indicative of bending of the tool bar 110 in the radial direction relative to the work piece 230. Measurements from such strain gauges 132 and 133 may be employed together with acceleration measured in the same radial direction for estimating deflection of the cutting edge in the radial direction, i.e. horizontally.

Embodiments may also be envisaged in which strain gauges are arranged at four sides of the tool bar 110 for measuring strain both on surfaces of the tool bar 110 which are expanded when the tool bar 110 bends, and on surfaces which are compressed when the tool bar 110 bends.

Figure 7:
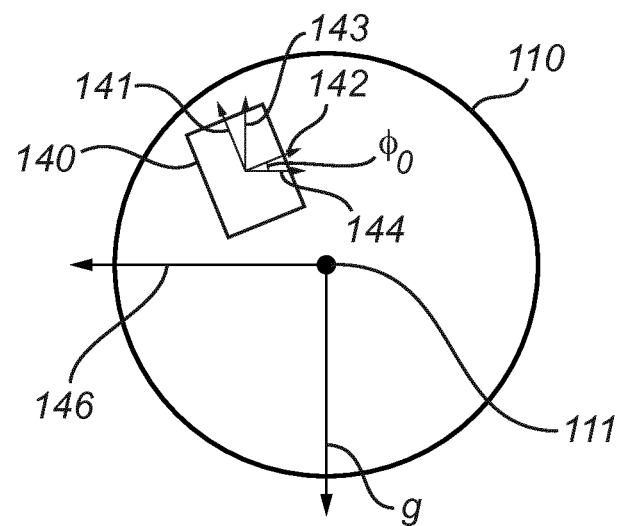
FIG. 7 is a cross sectional view along the line A-A' of the cutting tool shown in FIG. 1.

As will be described below with reference to FIG. 7, acceleration need not necessarily be measured in the radial and tangential directions. As long as accelerations are measured in two different directions (the two directions need to be linearly independent of each other and of the axis 111, and the angle between the two directions needs to be known), accelerations in the radial and tangential directions may be computed via trigonometry.

If deflection is to be estimated in both the radial and tangential directions, both accelerations and strain need to be measured in at least two directions.

Figure 4:
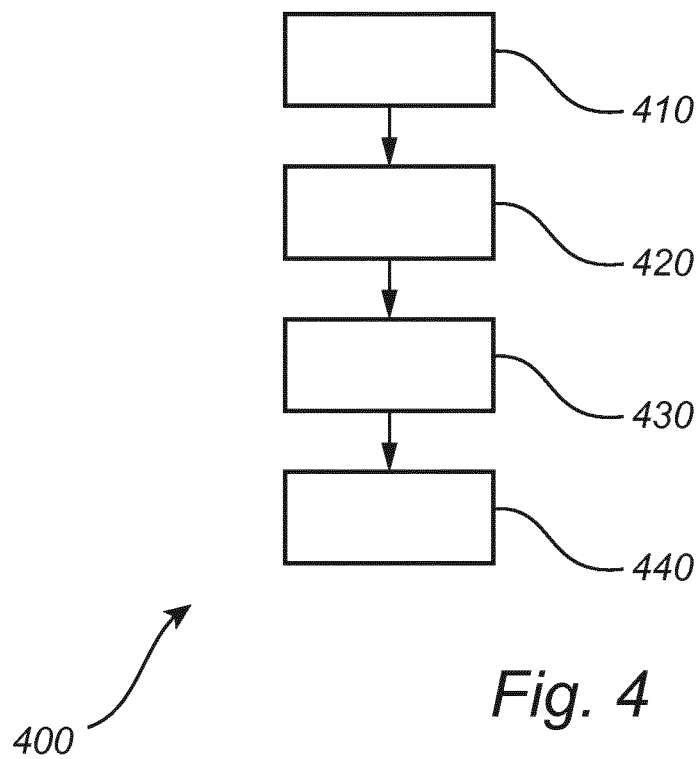
FIG. 4 is a flow chart of a method of estimating deflection of a cutting edge, according to an embodiment.

FIG. 4 is a flow chart of a method 400 for estimating deflection of the cutting edge 121, according to an embodiment. The method 400 comprises providing 410 the turning machine 200, measuring 420 strain at the tool bar 110 during turning, and measuring 430 acceleration at the tool bar 110 or at the cutting head 120 during turning. The method 400 also comprises estimating 440 deflection of the cutting edge 121 based on the measured strain and the measured acceleration. How the deflection is estimated will now be described below with reference to FIGS. 5 and 6.

During operation of the turning machine 200, cutting forces cause the tool bar 110 (and thereby the cutting edge 121) to deflect in the radial and tangential direction. The cutting forces have a large quasi-stationary (or slowly varying) part caused by deformation of the material of the work piece 230 and forming of chips of material. This causes the tool bar 110 (and therefore also the cutting edge 121) to deflect in the radial and tangential directions (also referred to as the x and y directions). A long tool bar 110 can deflect several millimeters away from the longitudinal center axis 111 (also referred to as the z-axis). In addition, the cutting forces vary with time due to chip segmentation, material inhomogeneities etc., but this variation is small compared to the main cutting forces. The small time-varying cutting forces will cause the tool bar 110 (and thereby the cutting edge 121) to vibrate with amplitudes that are small, compared to the stationary deflection. The stationary (or slowly varying) deflection may cause form errors in the machined hole 231, while the vibrations may affect surface quality and texture.

In order to estimate the total deflection of the cutting edge 121 (or the position of the cutting edge 121), small vibrations are measured in addition to a large stationary deflection. To do this, two different types of measurements are employed, each of which have different advantages and measurement regimes. The measurement types both have disadvantages which make it difficult to retrieve the required information with only one of the types of measurements.

The first type of measurement targets the large deflection and slowly varying cutting forces, and uses strain gauges 130-133 to measure the deflection-induced strain at the tool bar 110. The second type of measurement employs accelerometers 140 mounted in the front end of the cutting tool 100 to measure the acceleration. The time varying deviation from the deflected mean position is then calculated based on the measure acceleration.

The response of the tool bar 110 due to cutting forces can be described by its frequency response. The frequency response describes the dynamic properties of the tool bar 110 (i.e. how it responds to cutting forces of different frequencies) and depends on stiffness, mass distribution, internal damping etc. For static forces and for slowly-varying forces, both deflection δ of the tool bar 110 and the strain ε at the surface of the tool bar 110 (for example the strain where the strain gauge 130 is arranged) are directly proportional to the applied force and therefore also to each other according to the following relation $$\delta = k_\delta \varepsilon$$

The proportionality constant $k_\delta$ can be determined by applying a force to the tool bar 110 and comparing the resulting deflection ε with the signal from the strain gauge 130. The proportionality constant $k_\delta$ may for example be determined after the cutting tool 100 has been mounted at the turning machine 200 since the constant $k_\delta$ may depend on how the cutting tool 100 has been mounted at the particular turning machine 200.

The strain signal ε is usually very small and it will typically contain noise from electronics, thermal effects etc., which limits the minimum detectable strain, or the strain sensitivity. Low pass filtering is therefore necessary to obtain the desired accuracy for the intended application (i.e. to estimate deflection of the cutting edge 121).

At higher frequencies the strain signal ε is not very useful and there are at least two reasons for this. One reason is that, because of the dynamics of the cutting tool 100 and the existence of many vibration modes, there is no simple relationship between deflection and strain. Another reason is that the sensitivity of the strain measurement is too low to be able to detect (or distinguish) the small vibrations that are present at higher frequencies. The signal to noise ratio is simply too low for high frequencies. Instead, the acceleration of the front part of the cutting tool 100 is measured and from this the vibration (for example the vibration amplitude) can be estimated at higher frequencies. Estimating displacement using acceleration involves both filtering and integration. High-pass filtering is necessary because low frequency noise and drift will dominate the signal and limit the resolution. It would therefore be difficult to find the static and slowly varying deflection of the cutting edge 121 based only on the output from the accelerometer 140.

Figure 5:
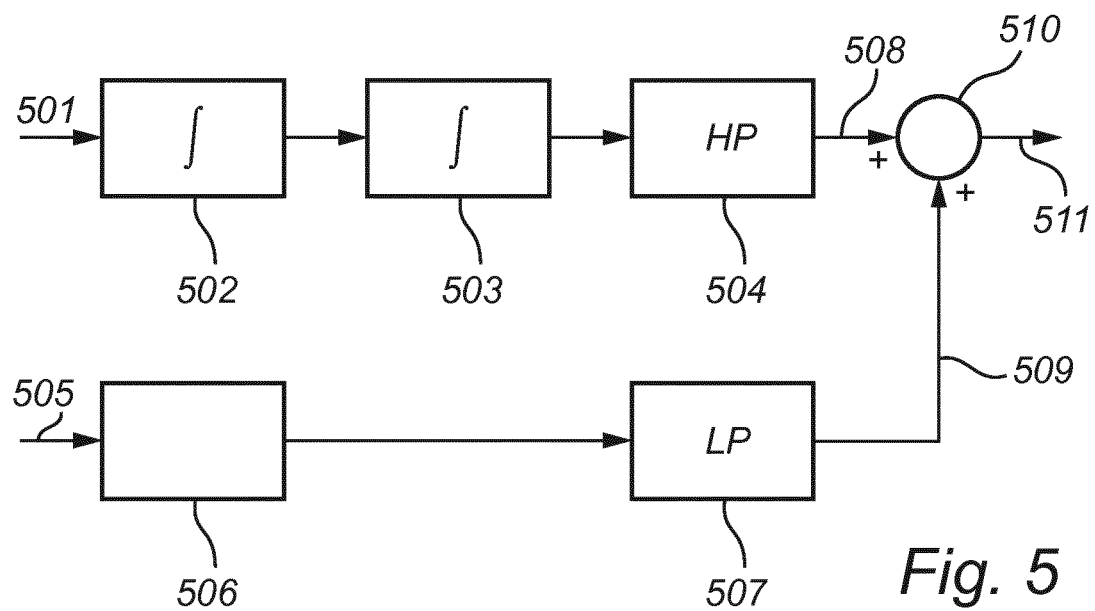
FIG. 5 is an overview of processing steps employed to estimate deflection of a cutting edge.

FIG. 5 shows an overview of how the two types of measurements may be combined to estimate the deflection of the cutting edge 121. The output 501 from the accelerometer 140 is subjected to two integrations 502 and 503 followed by high pass filtering 504. The output 505 from the strain gauge 130 is multiplied 506 by the proportionality constant $k_\delta$ and is subjected to low pass filtering 507. It will be appreciated that low pass filtering 507 may be performed before or after the multiplication 506 by the proportionality constant $k_\delta$ likewise, the high pass filtering 504 may for example be performed before or after the integration 502 and 503, or divided in two stages, one after each integration 502 and 503. The two filtered signals 508 and 509 are then combined 510 to provide an estimate 511 of the overall deflection. The filtered signals 508 and 509 may for example be combined 510 by summation, i.e. by adding the signals together. The high pass filtering 504 and the low pass filtering 507 may for example be employed to provide weighting of the signals prior to the summation 510.

The cut-off frequency and the frequency roll off characteristics of the high pass filter 504 and low pass filter 507 are chosen such that the accuracy of the estimated deflection is as good as possible. A particularly attractive choice in many internal turning operations (i.e. when the turning machine 200 causes the cutting edge 121 to cut material from an interior surface of the work piece 230) is to synchronize the cut-off frequency for the filters 504 and 507 with the rotational speed of the work piece 320. In this case, mean deflection (or stationary deflection), work piece 320 conicity and ovality is estimated from the strain signal 505, while chatter, impulses from chip jams, and other tool vibrations are estimated from the accelerometer signal 501.

Figure 6:
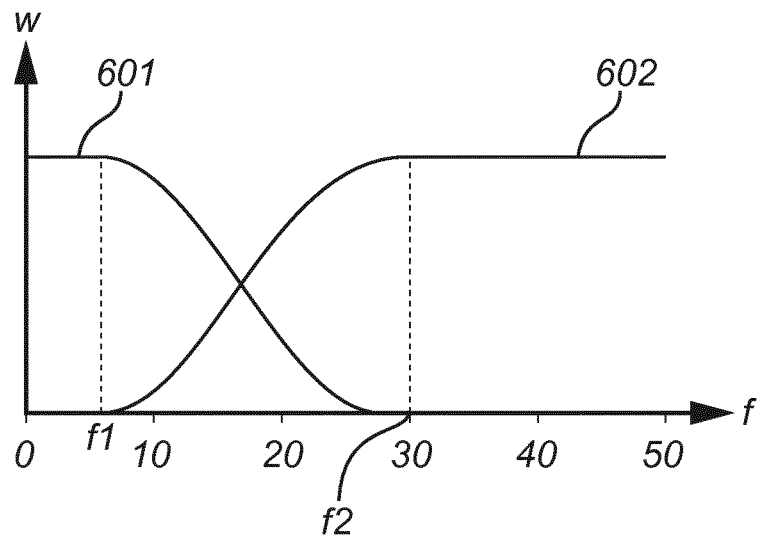
FIG. 6 shows frequency ranges in which different sensor types may be employed for estimating deflection of a cutting edge.

An example of how the high pass filtering 504 and the low pass filtering 507 may cause the sensor output to be weighted in different frequency ranges is shown in FIG. 6. In FIG. 6, the vertical axis shows weigh W and the horizontal axis shows frequency in Hz.

Deflection of the cutting edge 121 in a first frequency range may be estimated based on the measured strain 505. The first frequency range includes static (or mean) deflection and vibrations having frequencies up to a first frequency f1. The low pass filtering 507 of the strain data is illustrated in FIG. 6 by the curve 601.

Deflection of the cutting edge in a second frequency range may be estimated based on the measured acceleration 501. The second frequency range includes vibrations having frequencies above a second frequency f2 which is at least as high as the first frequency f1. The high pass filtering 504 of the data obtained using the accelerometer data 501 is illustrated in FIG. 6 by the curve 602.

Deflection of the cutting edge 121 in a third frequency range may be estimating based on both the measured strain 505 and the measured acceleration 501. The third frequency range includes vibrations having frequencies between the first and second frequencies f1 and f2. As indicated by the curves 601 and 602, the high pass filter 504 and the low pass filter 507 overlap in this region so that the estimated deflection in this third frequency range is a weighed combination in the form of a sum of the two filtered signals 508 and 509.

In the present example, the first frequency f1 is 7 Hz while the second frequency f2 is 30 Hz. The first and second frequencies f1 and f2 may for example be selected based on the speed of rotation of the work piece 320. If for example the work piece rotates at a speed of 10 revolutions per second (i.e. 1 Hz), the first frequency f1 may be selected above 10 Hz such that deflection components in the same frequency range as the rotation of the work piece 320 are estimated based on output from the strain gauge 130 instead of on output from the accelerometer 140.

The strain measured by the strain gauges 130-133 may for example be employed for estimation of deflection in the range 0-20 Hz, while the acceleration measured by the accelerometer 140 may for example be employed for estimation of deflection in the range 10-100 Hz. Both types of measurements may for example be employed in the overlapping frequency region to reduce the effect of measurement errors.

The accelerometer 140 may for example be sampled as fast as 1600 Hz. The sample rate of the strain gauges 130-133 may be lower but may for example be at twice the frequency of rotation of the work piece 320 so as to be able to detect ovality deviations in the work piece 320.

The estimated overall deflection may for example be provided in the form of a deflection spectrum including amplitudes of vibrations at different frequencies as well as the average deflection. Even if the position of the cutting edge 121 at a particular point in time may be difficult to estimate, the overall deflection may indicate a mean deflection of the cutting edge 121 and how far away from the mean deflection the vibrations cause the cutting edge 121 to move.

If a vibration amplitude above a certain level is detected, or a vibration energy/effect in a certain frequency band is detected, this may for example be an indication that the surface quality of the work piece 320 may be lower than usual, or that the cutting edge 121 is employed outside its recommended window of operating conditions. If the deflection is estimated in real time, the feed rate of the cutting tool 100 or the speed of rotation of the work piece 320 may then be modified to reduce the vibrations.

If the deflection of the cutting edge 121 is monitored in real time, the position of the cutting tool 100 may be adjusted by the machine 200 (for example via feedback to a CNC interface) to compensate for the static (or average) deflection.

The cutting process may be hidden from view if performed inside a hole 231 of the work piece 320. It may therefore be difficult for the operator to tell what is going on at the cutting edge 121. The estimated deflection may for example be employed to detect when the cutting process actually occurs, i.e. when the cutting edge 121 is in contact with the work piece 320 and is able to cut away material.

In some embodiments, the deflection may be estimated after the machining process has been completed. The estimated deflection may be employed to estimate the surface quality obtained at different regions of the work piece 320.

In the embodiment described with reference to FIG. 1, the accelerometer 140 is provided in the form of an accelerator chip 140. The accelerometer chip 140 may include one or more accelerometers (or accelerator circuits) for measuring acceleration in respective directions.

As the accelerometer chip 140 may deviate in orientation from the cutting tool 100 (or insert 121), the method 400 may include steps for calibrating the accelerometer chip 140 prior to turning. The calibration steps may for example be performed during manufacture or assembly of the cutting tool 100. The calibration steps will be described with reference to FIG. 7 which is a cross sectional view along the line A-A' of the cutting tool shown in FIG. 1.

As an initial step of the calibration, the method 400 may comprise arranging the cutting tool 100 at a reference rotational orientation $\phi_{ref}$ with respect to the axis 111. In other words, the cutting tool 100 is placed in a well-defined and known orientation $\phi_{ref}$ with respect to the gravitational field g, preferably with the insert 121 horizontally, pointing in the negative x-direction of the cutting tool 100 (i.e. in the radial direction 136, $\phi_{ref}=0$).

In the present embodiment, the accelerometer chip 140 measures acceleration in two directions 141 and 142 which are perpendicular to each other and to the axis 111. The directions 141 and 142 may be referred to as y-axis 141 and x-axis 142, respectively, of the chip 140. Since the chip 140 has been mounted in the cutting tool 100, the two directions 141 and 142 are fixed relative to the cutting tool 100. The accelerometer chip 140 may preferably have been arranged in the cutting tool 100 with the x-axis 142 close to the x-axis 144 of the cutting tool 100 and the y-axis 141 close to the y-axis 143 of the cutting tool 100, as shown in FIG. 7.

The method 400 may continue by measuring reference accelerations in the two directions 141 and 142 provided by the chip 140. The measured accelerations $A_{xref}$ and $A_{yref}$ may be expresses as $$A_{xref} = g \sin(\phi_{ref}-\phi_0)$$

$$A_{yref} = g \cos(\phi_{ref}-\phi_0)$$

where $\phi_0$ is the mounting angle of the chip 140 in the cutting tool 100. In other words, $\phi_0$ is the angle between the accelerometer x-axis 142 and the tool x-axis 144. With these definitions, the tool axis 111 coincides with the machine axis, while the radial direction 146 now is in the negative x-direction. When in use, the insert 121 is pointing in a direction $\phi_{rad}$ with respect to the horizontal direction. In turning machines such as a flat-bed lathe, it is often desirable to have $\phi_{rad}=0$ while in other turning machines it may be desirable to have $\phi_{rad}=240$ degrees (or 4p/3 radians).

The method 400 may continue by computing, based on the measured reference accelerations, a parameter value indicative of the mounting angle $\phi_0$ of the accelerometer chip 140 relative to the cutting tool 100. For example, the mounting angle $\phi_0$ itself may then be obtained via $$\phi_{ref} - \phi_0 = \tan^{-1}\left(\frac{A_{xref}}{A_{yref}}\right)$$

The method 400 may continue by arranging the cutting tool 100 at a new rotational orientation with respect to the axis 111. This corresponds to the step 410 of providing the turning machine 200.

The above described step of estimating 440 the deflection of the cutting edge 121 may be based also on the parameter value $\phi_0$. More precisely, acceleration $A_{rad}$ in the radial direction 136 (horizontal) and the acceleration $A_{tan}$ in the tangential direction (vertical) may be computed via the following equations:

$$A_{rad} = -A_x \cos \phi_0 + A_y \sin \phi_0$$

$$A_{tan} = -A_x \sin \phi_0 - A_y \cos \phi_0$$

where $A_x$ is the acceleration along the x axis of the chip 140 (corresponds to the direction 142) and $A_y$ is the acceleration along the y axis of the chip 140 (corresponds to the direction 141). As the mounting angle $\phi_0$ has been determined in the calibration procedure, the equation $$\phi_{rad} - \phi_0 = \tan^{-1}\left(\frac{A_{x0}}{A_{y0}}\right)$$

can be used to find the rotational orientation $\phi_{rad}$ of the cutting tool 100. Deflection of the cutting edge 121 in the radial direction may be estimated based on the corresponding acceleration $A_{rad}$ and the strain measured in that direction. Similarly, deflection of the cutting head 121 in the tangential direction may be estimated based on the corresponding acceleration $A_{tan}$ and the strain measured in that direction.

During installation of the cutting tool 100, a desired orientation of the cutting tool 100 may be obtained by plotting the difference between the current angle of orientation $\phi_{rad}$ and the desired angle of orientation for the cutting tool 100. The cutting tool 100 may be rotated until a desired orientation is obtained.

The strain gauges 130-133 may have been arranged during manufacture of the cutting tool 100 so as to measure strain in the tangential and radial directions. The proper positioning and orientation of the strain gauges 130-133 may for example have been calibrated manually before the cutting tool 100 is delivered to customers. If the strain gauges 130-133 are not that well aligned with the radial and tangential directions, this misalignment may for example be compensated for via calibration of how the output from the strain gauges 130-133 is interpreted.

In the embodiment described with reference to FIG. 7, the directions 141 and 142 are perpendicular to each other. Embodiments may also be envisaged in which the directions 141 and 142 are transverse (or non-parallel) to each other, but not perpendicular to each other. As the skilled person is well-aware, accelerations measured in two directions which are not perpendicular to each other may be transformed, using standard trigonometric relations, into accelerations in two directions perpendicular to each other, as long as the angle between the two original directions is known. Similar computations as those described above may therefore be employed also in such settings.

Embodiments may also be envisaged in which the directions 141 and 142 are transverse (or non-parallel) to the axis 111 but not necessarily perpendicular to the axis 111. If the directions 141 and 142 are not perpendicular to the axis 111, acceleration may be measured also in one or more additional directions for estimating accelerations in the radial and tangential directions. The chip 130 may for example measure accelerations in three directions which are perpendicular to each other.

The person skilled in the art realizes that the present invention is by no means limited to the preferred embodiments described above. On the contrary, many modifications and variations are possible within the scope of the appended claims. For example, the cutting tool 100 may include multiple accelerometers 140 which may for example be provided in the form of multiple accelerometer chips. It will be appreciated that multiple accelerometers 140 and strain gauges 130 distributed over (and/or inside) the cutting tool 100 may for example be employed to estimate the deflection of the cutting edge 121.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A cutting tool for use in turning, the cutting tool comprising:
   a tool bar;
   a cutting head located at the tool bar and including a cutting edge;
   at least one strain gauge arranged to measure strain at the tool bar configured for estimation of deflection of the cutting edge in a first frequency range, the first frequency range including static deflection and vibrations having frequencies up to a first frequency; and
   at least one accelerometer arranged to measure acceleration at the tool bar or at the cutting head configured for estimation of deflection of the cutting edge in a second frequency range, the second frequency range including vibrations having frequencies above a second frequency which is at least as high as the first frequency, and wherein the accelerometer is arranged closer to the cutting edge than the strain gauge in an axial direction of the tool bar.

2. The cutting tool of claim 1, wherein a portion of the tool bar along the axial direction of the tool bar is susceptible to a larger strain than any other part of the tool bar, and wherein the strain gauge is arranged at said certain portion.

3. The cutting tool of claim 1, further comprising a machine interface for mounting the cutting tool at a turning machine, wherein a distance from the strain gauge to the cutting edge is larger than a distance from the strain gauge to the machine interface.

4. The cutting tool of claim 1, wherein the tool bar has a stiffness which transitions between a lower and a higher value at a location along the tool bar where a diameter of the tool bar changes or where a material of the tool bar changes, and wherein a distance from the strain gauge to the cutting edge is larger than a distance from the strain gauge to the certain location.

5. The cutting tool of claim 1, further comprising a machine interface for mounting the cutting tool at a turning machine, wherein a distance from the accelerometer to the machine interface is larger than a distance from the accelerometer to the cutting edge.

6. The cutting tool of claim 5, wherein the distance from the accelerometer to the machine interface is at least four times as long as the distance from the accelerometer to the cutting edge, and wherein a distance from the strain gauge to the cutting edge is at least four times as large as a distance from the strain gauge to the machine interface.

7. The cutting tool of claim 1, wherein the strain gauge is arranged to measure strain indicative of bending of the tool bar in a radial direction relative to a work piece, or to measure strain indicative of bending of the tool bar in a tangential direction relative to the work piece.

8. The cutting tool of claim 1, wherein a plurality of strain gauges are arranged to measure strain at the tool bar indicative of bending of the tool bar and a plurality of accelerometers are arranged to measure acceleration at the tool bar or at the cutting head, wherein the accelerometers are arranged closer to the cutting edge than the strain gauges.

9. A turning machine comprising the cutting tool as defined in claim 1.

10. The turning machine of claim 9, further comprising a processor configured to estimate deflection of the cutting edge based on output from the strain gauge and the accelerometer.

11. A method for estimating deflection of a cutting edge of a cutting head, the method comprising:
   providing a turning machine having a cutting tool, wherein the cutting tool includes a tool bar and the cutting head, at least one strain gauge and at least one accelerometer, the cutting head being located at the tool bar;
   measuring, during turning, strain at the tool bar using the at least one strain gauge;
   measuring, during turning, acceleration at the tool bar or at the cutting head using the at least one accelerometer; and
   estimating deflection of the cutting edge based on the measured strain and the measured acceleration, wherein the step of estimating the deflection includes estimating, based on the measured strain, deflection of the cutting edge in a first frequency range, the first frequency range including static deflection and vibrations having frequencies up to a first frequency and estimating, based on the measured acceleration, deflection of the cutting edge in a second frequency range, the second frequency range including vibrations having frequencies above a second frequency which is at least as high as the first frequency.

12. The method of claim 11, wherein a distance from the cutting edge to a position at which the strain is measured is longer than a distance from the cutting edge to a position at which the acceleration is measured.

13. The method of claim 11, wherein the step of estimating the deflection includes estimating, based on the measured strain and the measured acceleration, deflection in a third frequency range, the third frequency range including vibrations having frequencies between the first and second frequency.

14. The method of claim 11, further comprising:
measuring acceleration at the cutting tool prior to turning; and
estimating an orientation of the cutting tool based on the acceleration measured prior to turning, wherein at least one accelerometer is employed for the measuring of acceleration both prior to turning and during turning.

* * * * *